April 23, 1957  P. R. FORGRAVE  2,789,462
LIGHT POLARIZING DEVICE FOR USE AS SUNGLASSES
OR AS STEREO VIEWERS
Filed July 13, 1953

Paul R. Forgrave
INVENTOR.

BY
Attorneys

United States Patent Office 2,789,462
Patented Apr. 23, 1957

2,789,462

LIGHT POLARIZING DEVICE FOR USE AS SUNGLASSES OR AS STEREO VIEWERS

Paul R. Forgrave, St. Joseph, Mo.

Application July 13, 1953, Serial No. 367,412

2 Claims. (Cl. 88—41)

This invention relates to light polarizing devices and particularly to eyeglasses utilizing such polarizing devices.

Eyeglasses with lenses, made of a material plane polarizing the light passing through them, are known and are extensively used as eye shades, sun glasses and anti-glare devices for drivers, welders and other persons. Frequently these lenses are made of a material having the molecules on its opposite sides oriented in different directions, and moreover in addition dichroic dyes of different colors are usually incorporated in said oriented surfaces. The glasses in sun shade or anti-glare devices are usually so arranged that the plane of polarization is a fixed vertical or horizontal plane.

It is further well known that plane polarized light is also used in connection with the production of stereoscopic motion pictures in which different pictures must be presented to the two eyes and in which the picture made for one eye must not be viewed by the other eye. Each of the two eyes then receives solely a series of pictures made only for it. Such a series of different pictures made for the two eyes is then combined to a stereoscopic picture by a mental operation of the spectator.

In order to exclude the picture made for instance for the right eye from being viewed by the left eye and vice versa, light polarized in two planes at right angles to each other is used for these two picture series. The pictures are either projected or looked at simultaneously or successively and the correct picture for each of the two eyes is therefore received through an eyeglass or lens the polarization plane of which coincides with that of the light emanating from the picture, while the picture the polarization of which is at right angles to that of the lens before the eye is not received. Usually the two planes of polarization for the two lenses of the viewing apparatus are at an angle of 45° relatively to the horizontal or vertical plane.

In order to view the stereoscopic picture in a theater either a viewing apparatus is provided at each seat or—more frequently—viewing glasses or device are handed to the patrons of the theater with their tickets and are not returned, so that they are only used once. They are therefore of a very cheap and primitive construction and usually consist merely of a punched out card forming a frame holding lenses of plastic sheet material which has been prepared in the manner above stated. These eyeglasses cannot be fitted and the awkwardness and generally unsatisfactory nature of these devices have therefore been a constant source of complaint. Further, on account of this fact the showing of stereoscopic projection pictures operating with polarized light is not favored.

The use of plane polarizing lenses as sun glasses or eye shades entails, as above explained, a position of the plane of polarization in the two lenses which is different from the position of the plane when used for stereoscopic purposes. The object of the invention consists in a polarization device which is usable for a number of different purposes and more specifically which is usable as a sun glass or eye shade as well as a viewing device for cinematographic stereoscopic pictures.

A further object of the invention consists in providing a polarizing device with a frame holding polarized lenses in such a manner that the plane of polarization of each of the lenses can be easily and separately adjusted so that the two polarizing lenses may be polarized either in the same plane or in planes at right angles to each other.

A further object of the invention consists in providing means which permit, without special regulatory or other adjustment, to bring the lenses while wearing the eyeglasses in such a position in front of the two eyes that the planes of polarization are either parallel or at right angles to each other.

Further and more specific objects of the invention will be apparent from the following detailed specification.

The invention is illustrated in the accompanying drawing showing two embodiments thereof. It is however to be understood that the two modifications shown illustrate the invention only by way of example, and that the examples shown are illustrative but not limitative so that a departure from the construction illustrated in the drawing does not necessarily involve a departure from the principle of the invention.

Figure 1:
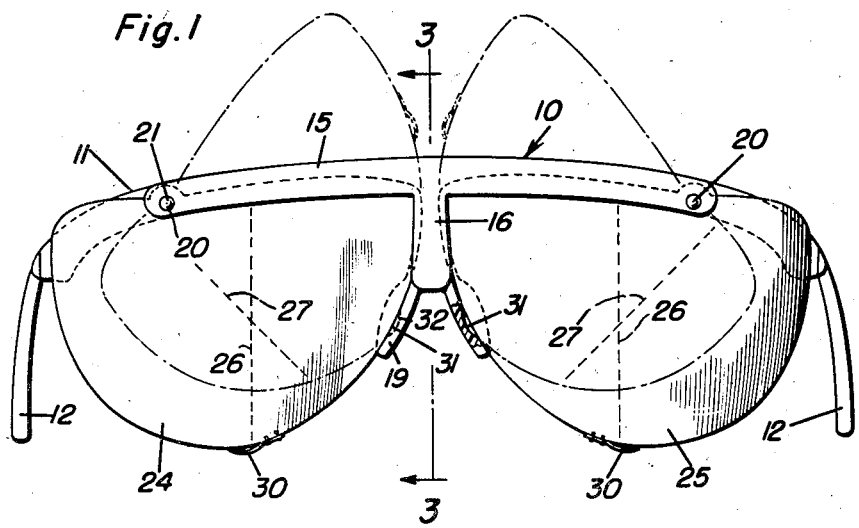
Figure 1 is an elevational front view of the device, the normal position of the polarizing lenses, when used as a sun glass or eye shade being indicated in full lines; while the position of the lenses when used as a viewing apparatus for stereoscopic pictures is indicated in dots and dashes.
Figure 2:
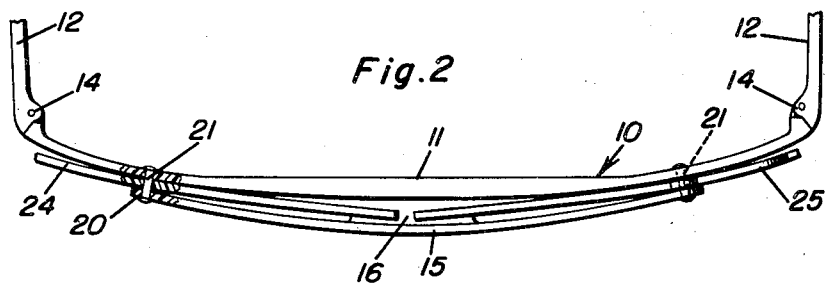
Figure 2 is a plan view of the device.
Figure 3:
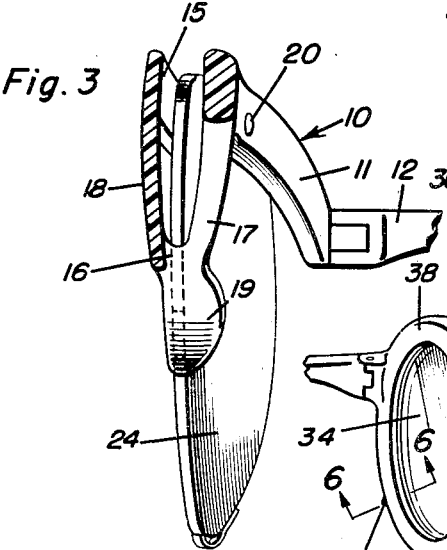
Figure 3 is an elevational sectional view of the device shown in Figure 1, the section being taken along line 3—3 of Figure 1.

The modification of the invention illustrated in Figures 1 to 4 shows a sun glass or eye shade which may be converted into a polarized viewing device in the manner above indicated. This type of device is provided with a frame 10 which consists of an upper transverse supporting bar or rear bridge member 11 to which the temples or ear pieces 12 may be fixed by means of hinges 14, as customary. Further the frame consists of a frontal bar 15 which is spaced from the upper transverse supporting bar or rear bridge member 11 and which extends along the said bar in substantial parallelism thereto. The frontal bar member 15 is joined to the supporting transverse rear bar member 11 in the center by means of a nose piece 16 which is held by downwardly projecting arms 17, 18 of the transverse supporting bar member 11 and the frontal bar 15 of the frame respectively. The transverse supporting bar member 11, the frontal bar 15 and the nose piece 16 preferably form a one-piece or consists of parts which are fixedly joined together.

The nose piece may be provided with the customary two nose clips or stops 19 by means of which it is seated on the nose of the wearer.

The rear supporting bar 11 and the frontal bar 15 are both provided on each side with pivot holes 20 carrying a pivot 21 by which the polarizing lenses 24 and 25 are held on the frame 10. These lenses may therefore swing around the pivots 21 and thus adopt different positions relatively to each other. Grooves 29 may be provided in the nose piece to guide the marginal portion of the lenses during this movement.

In order to fix the position of the polarizing lenses in such a manner that they may not swing around the pivots under the influence of gravity or of shocks and the like, said lenses may be provided at their rims with spring stops 30, 31 which may cooperate with a suitable groove 32 on the side of the nose clips 19 which are turned towards them. The small spring stops 30, 31 fall alternatively into the groove and thus produce the fixation of the polarizing lenses in both positions to which they are moved.

When the lenses 24, 25 assume their normal position in which they operate as an eye shade or as a sun glass or an anti-glare device, the plane of polarization in both lenses is the same and is for example a vertical plane in the normal position of the eyeglass as indicated by the dotted arrows 26 in Figure 1. If however, the device is used as a viewing device for stereoscopic cinematographic pictures the two polarizing lenses are turned around, so that the two planes of polarization of the two lenses fall into two different directions indicated in Figure 1 by the arrows 27 in dots and dashes. As seen the direction of the plane of polarization for both lenses is at an angle of 45° with respect to the vertical plane indicated by the arrows 26 and at an angle of 90° relatively to each other. In this position, therefore, light polarized in a plane indicated by one of the arrows 27 can only pass through one of the polarizing lenses but cannot pass through the other polarizing lens, as the plane of polarization is at right angles thereto.

Figure 6:
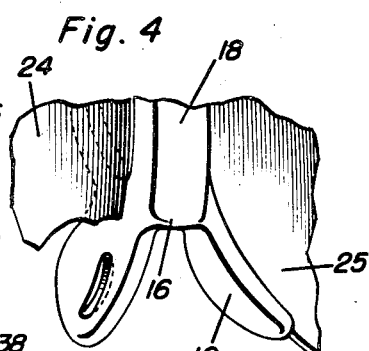
Figure 6 is a fragmentary elevational sectional view, the section being taken along line 6—6 of Figure 5.
Figure 4:
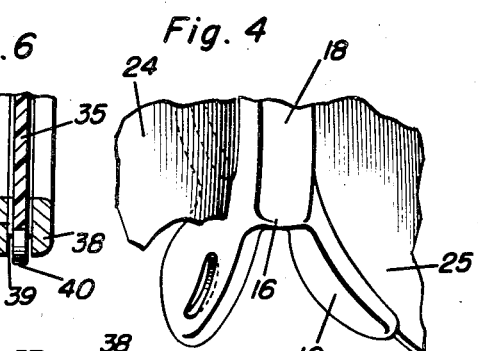
Figure 4 is a perspective view of a detail.
Figure 5:
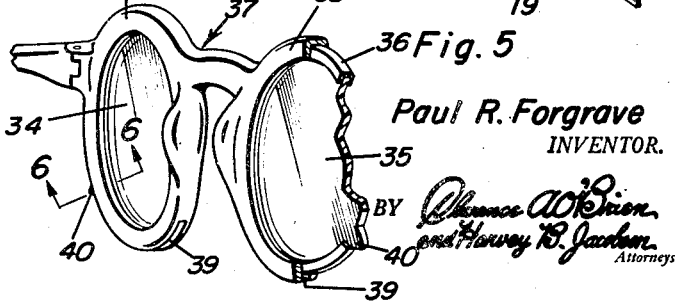
Figure 5 is a perspective view, partly in section of a modified construction of the device.

According to the modification shown in Figures 5 and 6 the polarizing lenses 34, 35 are held within a rim 36 which is inserted into the frame 37. The frame in this case comprises circular eye pieces 38 each provided with a lateral slot 39. The rim holding the polarizing lens may be provided with a small projection or lug 40 projecting through the slot and the wearer of the polarizing device may therefore move the polarizing lens and rotate it through an angle of 45°.

It is thus seen that the device according to the invention provides a simple effective means for converting an eye shade, a sun glass, or an anti-glare device for drivers or for other purposes which is provided with so-called polaroid lenses into a viewing apparatus for viewing stereoscopic pictures. As a sun shade or eye protective glass is a constantly used implement its construction may be much more elaborate than that of a viewing means which is only used once and it may either be sold with the ticket in a cinematographic theater or it may allow to the wearer who primarily uses the device as a sun glass or optical device the conversion to a viewing apparatus whenever needed. It has also the additional advantage that it may be worn permanently during a cinematographic show which consists partly of ordinary pictures and partly of stereoscopic pictures and that only the simple adjustment above described need be made for converting it into a stereoscopic viewing apparatus which adjustment can be made without removing the device from the eyes.

It will also be clear that unessential changes may be made and that the construction may be modified without in any way departing from the essence of the invention as defined by the annexed claims.

What is claimed as new is as follows:

1. Light polarizing eyeglasses for alternative use as sun shading glasses and as viewers for stereoscopic and similar pictures comprising a rigid eyeglass frame with a depending nose piece, a plane polarizing lens for each eye, a pivot for each lens at right angles to the plane of the lens, held on the said rigid frame, each lens being mounted on said pivot for a swinging movement around the pivot axis in its own plane, said movement bringing the lens from a position in which the planes of polarization of the two lenses are parallel to a position in which said planes of polarization of the two lenses are at right angles with respect to each other, each lens being partly of circular configuration with the circular portion having its center in the axis of the pivot around which the lens is swingable, an arcuate portion on each side of the nose piece of the rigid frame, the arcuate portion being circular with the center of the circle in the axis of the aforesaid pivot and having the same radius as the circular portion of the lens, the rim of each lens and the arcuate portion of the frame being provided with interengaging stop members for arresting the lens, said stop members being so arranged and spaced that the lenses when moved along the arcuate frame portion are arrested in the position in which the planes of polarization of the two lenses are parallel and in the position in which the planes of polarization are at right angles to each other respectively.

2. Light polarizing eyeglasses as claimed in claim 1 wherein the rim of each lens is provided with spring stops for arresting the lens, and the arcuate portion depending on each side of the nose piece is provided with grooves accommodating the spring stops, said spring stops and grooves being so arranged on the two sides that the lenses when moved along the arcuate portion of the nose niece are arrested in the position in which the planes of polarization of the two lenses are parallel and in the position in which the planes of polarization are at right angles to each other respectively.

References Cited in the file of this patent

UNITED STATES PATENTS

| | | |
|---|---|---|
| 564,518 | Heilborn | July 21, 1896 |
| 2,304,504 | Metzger et al. | Dec. 8, 1942 |
| 2,688,900 | Silverman | Sept. 14, 1954 |

FOREIGN PATENTS

| | | |
|---|---|---|
| 1,010,599 | France | Mar. 26, 1952 |
| 619,006 | Great Britain | Mar. 2, 1949 |